Patented Sept. 27, 1938

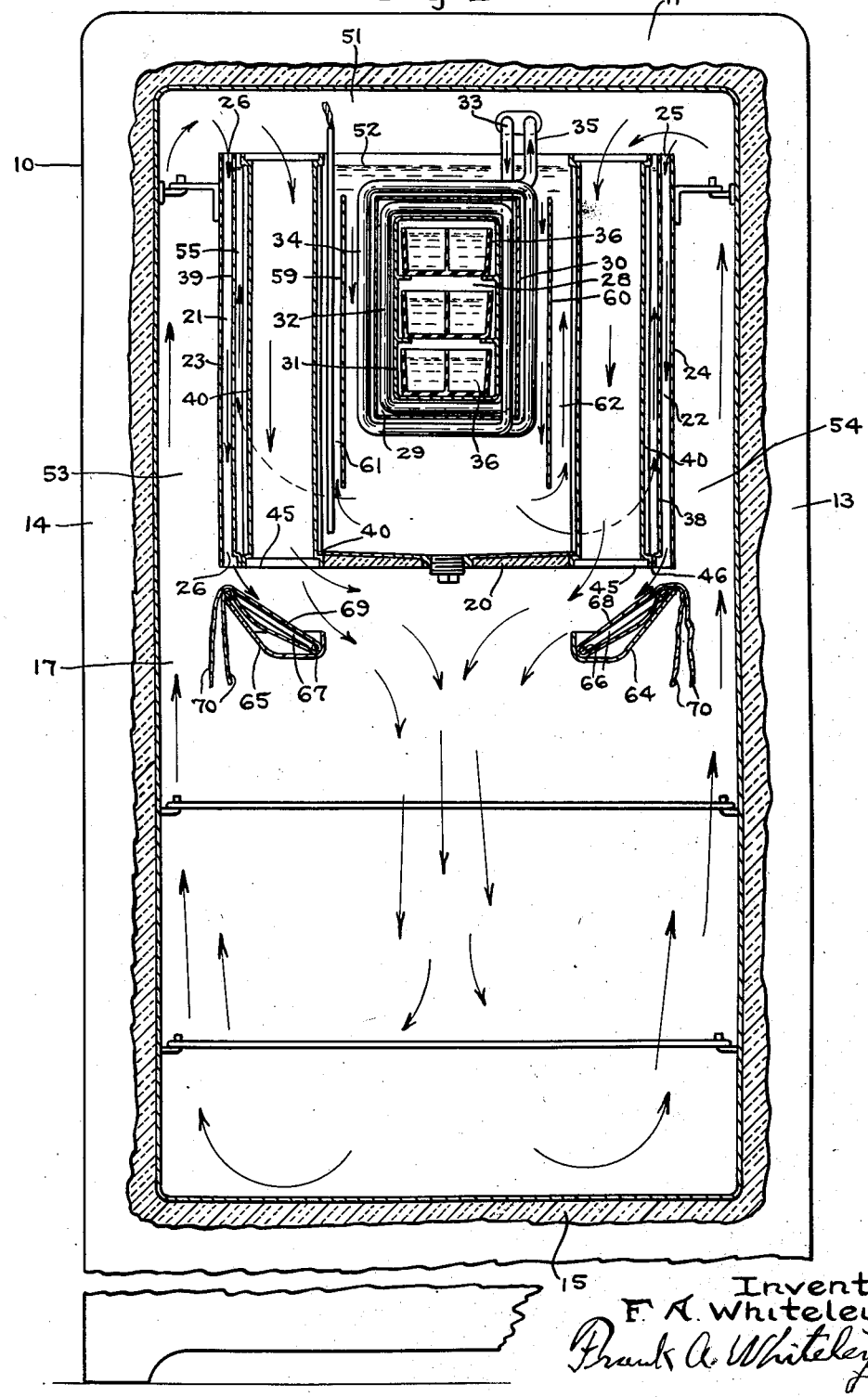

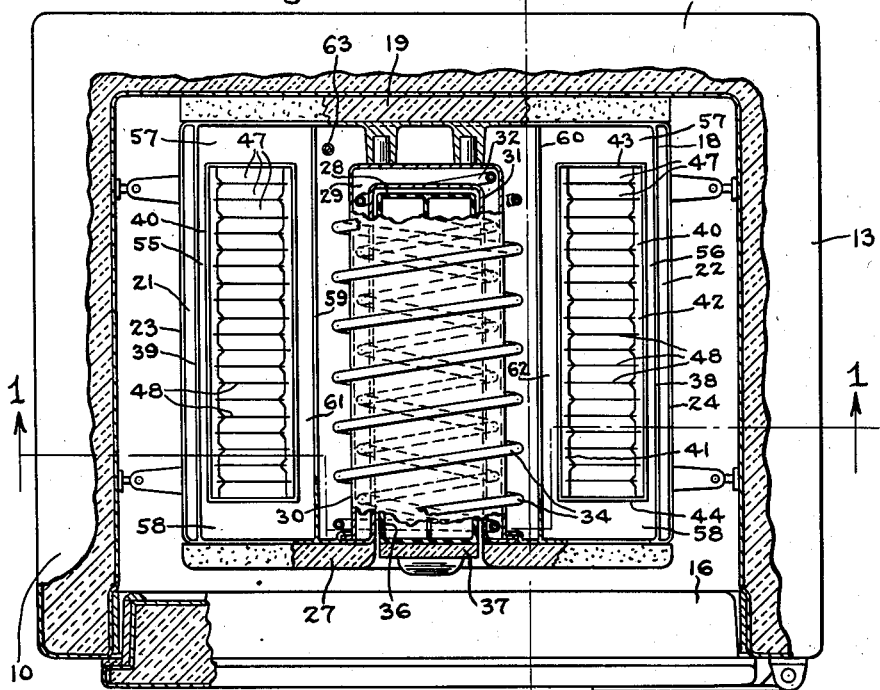
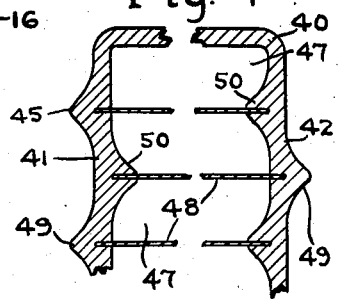
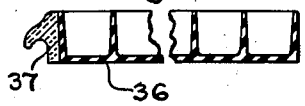

2,131,700

UNITED STATES PATENT OFFICE 2,131,700

APPARATUS FOR EFFECTING REFRIGERATION AIR-CONDITIONING

Frank A. Whiteley, Minneapolis, Minn.

Application March 1, 1937, Serial No. 128,377

9 Claims. (Cl. 62—95)

My invention relates to apparatus for effecting refrigeration air-conditioning, and has for its object to provide within a closed chamber, specifically the refrigerating chamber of a domestic refrigerator, a means of employing mechanical refrigeration such that there will be continuous and uniform circulation of the air within the chamber and re-vaporization of any water condensed therefrom, so that said air will at all times be saturated or substantially saturated and there will be no tendency for dehydration of food within the refrigerator compartment.

More specifically stated, it is an object of my invention to provide means for effecting air-conditioned refrigerating which consists in having within the closed chamber to be refrigerated a tank containing a liquid, which may be water or other suitable liquid, in which is immersed a mechanical refrigerating unit, preferably embodying an interior freezing chamber separated from the water within the tank, and providing heat exchangers having passages extending through said liquid, in practice vertical passageways, preferably one said heat exchanger on each side of the refrigerating unit, together with means whereby the liquid as it is cooled by the refrigerating unit will be caused to circulate in the tank along the walls of the heat exchangers and back to the refrigerating unit as heat is extracted from the air within the chamber, and with means whereby the air in the chamber will be caused to circulate therein, going through the said heat exchangers to be cooled thereby and thence falling to the bottom of the chamber and causing the warmer air to ascend to the top of said heat exchanger and pass back through the cooling passages therein, and providing for re-vaporizing within the chamber and water condensed from said cooled air.

It is a further object of my invention to provide means for effecting the above-noted steps of process which will be simple, efficient and inexpensive, which provide cooling surfaces exposed to the air only under conditions which make possible taking care of all water condensed from the air within the refrigerator chamber, and providing means for receiving said water as it is condensed, and causing it to be re-evaporated into the air within the chamber.

It is a further object of my invention to provide a heat exchanger or heat exchangers each consisting of an air leg having large areas exposed to heat exchange of the air therein, specifically an air leg heat exchanger corresponding to those shown in my co-pending application Serial Number 121,518, filed January 21, 1937, in which a multiplicity of heat exchanger fin plates are integrally cast at their edges in the walls of the air leg, said air legs being positioned herein so as to extend across the tank and have the walls bathed by the liquid within the tank and the multiplicity of passages through the air legs extending vertically, whereby the cooling of the air therein will cause movement of air downwardly and the warmed air will rise through uncooled passages and thus continuously circulate through said air legs and about the interior of the refrigerator.

It is a further object of my invention to control the means for cooling the liquid within the tank so that its temperature shall be maintained above but near the freezing point, say around 35°.

It is a further object of my invention to provide means including absorbent material such as wicking to catch the drip of condensation, if there is any, from the passages within said air legs and subject it to the rising currents of air, whereby said moisture will be re-vaporized in the chamber, and the chamber will be air-conditioned and cooled in such a way as to have no tendency to dehydrate food within the chamber. It is a further object of the invention to provide in the liquid within the tank, which will have its surface open to the circulating air, a suitable deodorant, so that odors arising from the food within the refrigerator may be absorbed and effective deodorizing result.

The full objects and advantages of my invention are hereinafter described in detail, and the novel features thereof are particularly pointed out in the claims.

In the drawings illustrating an application of my invention in one form—

Fig. 1 is a sectional elevation view through a refrigerator embodying my invention taken on line 1—1 of Fig. 2. Fig. 2 is a part sectional plan view taken from the top of the refrigerator with most of the top removed. Fig. 3 is a sectional partial elevation view taken on line 3—3 of Fig. 2 at right angles to the view of Fig. 1. Fig. 4 is a sectional detail of the heat exchanger employed. Fig. 5 is a sectional detail view of a common form of ice freezing trough showing its insulating front.

Although it must be understood that my invention is applicable to any form of closed chamber to be refrigerated, there is shown in the drawings the box of a domestic refrigerator 10 having a top wall 11, back wall 12, side walls 13 and 14, bottom wall 15 and front door 16 all of well-known and common construction.

Within the upper part of the chamber 17 within the above-defined walls is suspended a tank 18 which has its back wall insulated, as indicated at 19, its bottom wall insulated as indicated at 20, Fig. 1, and its side walls formed with air passages 21 and 22, Figs. 1 and 2, by means of vertical wall plates 23 and 24, whereby said air passages are open at top and bottom as indicated at 25 and 26, Fig. 1. The front wall of tank 18 is also insulated as indicated at 27 in Figs. 2 and 3.

Within the central space in tank 18 is preferably formed a closed chamber 28 having watertight passages 29 all around it formed by outer casing 30 and inner casing 31, and within this space 28 are tube coils 32 of an evaporator connected by tube 33 with a compressor, not shown, in a customary way. The tube coils 32 continue around the outside of casing 30 but spaced therefrom in other coils 34, running to the compressor through tube 35. The chamber 28 is thus formed as a freezing chamber within which slide trays 36 of well-known construction for holding water to be frozen in cubes, excepting that the fronts of these trays will have an insulating cover 37, as clearly shown in Figs. 2 and 5. The tank 18 thus has all of its walls insulated from the interior of chamber 17 excepting the side walls 38 and 39, but these walls are in effect insulated from the interior of chamber 17 by reason of the outer partitions 23 and 24 forming the vertical passageways 21 and 22.

Extending through the chamber within tank 18 on each side of the refrigerator unit formed of coils 32 and 34 and freezing chamber 28 are heat exchangers 40 which are exactly the same on each side. Each of these heat exchangers, Fig. 2, comprises side walls 41 and 42, an end wall 43 and an end wall 44, all said walls being spaced from the inner wall of tank 18, said heat exchangers being sealed in to the bottom of said tank, as indicated at 45 and 46 in Fig. 1. Also, each of the heat exchangers, Figs. 2 and 4, is divided into a multiplicity of vertical passageways 47 by means of fin plates 48, which, as shown in Fig. 4, have their edges fused into the walls 41 and 42 of the heat exchanger air legs 40. The walls 42, as shown in detail in Fig. 4, are preferably thickened alternatively outside and inside of the walls 41 and 42, as at 49 and 50, to give a better fusing union of the edges of the plates 48 with the respective walls 41 and 42, and to increase the area of said walls exposed to the cooling liquid within tank 18. The passages 47 thus extend vertically down through the tank from a space 51 above the same to their discharge point at its bottom, as clearly shown in Fig. 1.

Within the tank 18 is a liquid having its upper level at substantially the point indicated at 52 in Fig. 1. This liquid may be water or any suitable non-freezing solution, and may contain some deodorant material. The surface 52 of the liquid is open to the space 51 at the top of the refrigerator and this space connects not only with the passages 47 in the heat exchangers 40 and with the passages 21 and 22 at each side of the tank 18, but also with side passages 53 and 54 which form channels for ascending currents of warmer air in the circulation system, hereinafter to be pointed out.

The water within tank 18 extends entirely around the heat exchangers 40, passing to passageways 55 and 56 back of said heat exchangers around their ends through front and rear passageways 57 and 58, Fig. 2, and under and over transverse partitions 59 and 60, Fig. 1, which in common with passageways 55 and 56 form passageways 61 and 62 for ascending columns of water in the circulation thereof within tank 18, as hereinafter pointed out. A thermostatic member 63 of well-known construction extends toward the bottom of the tank 18 adjacent a heat exchanger 40 which will control the compressor mechanism, not shown, in a well-known way and turn the same off whenever a predetermined low temperature is reached, say 35° F., and will turn the compressor back on when the temperature goes to a predetermined point above the minimum temperature desired.

Condensation can take place only on the tank walls 38 and 39 in passageways 55 and 56 and on the walls of the heat exchanger passages 47, since all other walls of the tank are insulated. Any condensation which does take place, therefore, will gravitate downward and may drip from the bottoms of these walls. To catch such condensation I provide troughs 64 and 65, which underlie all of said passages, and which may be preliminarily filled or partly filled with water, as desired. Supported by removable wire frames 66 and 67, adapted to be angularly positioned within the troughs 64 and 65, are flexible evaporator members 68 and 69, which as clearly shown in Fig. 1, underlie the aforesaid passages from which condensation may drip, and which dip down into troughs 64 and 65 and into any water which may be present in said troughs. These evaporator members 68 and 69 may be made of wicking, cords or any type of fabric which has a high capillary transmission quality, and the ends of the evaporators will hang down as indicated at 70 in Fig. 1. It follows, therefore, that the water which drips from walls of cooling passageways in the heat exchangers or from side walls 38 and 39 of the tank will fall upon the evaporators 68 and 69 and by capillary action together with water from within the troughs will be moved out into the depending portions 70 thereof where said water will be immediately revaporized within the compartment of the refrigerator so that there will be no drying of the air in said compartment and no tendency to dehydrate materials stored therein.

The operation of my invention is as follows: The liquid in the tank is cooled by the evaporator coils 32 and 34 of the mechanical refrigerating unit, and gravitates to the bottom of the tank. At the same time the water in passageways 61, 62 and 55, 56 will be warmed by heat exchange with the air in the passageways 47 of the heat exchangers and the passageways 21 and 22 along the side walls 38 and 39 of the tank 18. The warmed water will rise within said passageways, being displaced by the cold water flowing in at the bottom, and will flow up over the tops of partitions 59 and 60, and around the ends of heat exchangers 40 and over the tops of said partitions from passageways 55, 56, where it will flow over the coils of the mechanical refrigerating unit and again be cooled, thus producing an automatic circulation of the liquid on each side of the refrigerating unit and about the walls of the heat exchangers 40, whereby heat is exchanged with the air of the refrigerating compartment and transferred through the coils of the refrigerating unit in a well-known way. This double circulation within tank 18 is indicated by arrows.

There will also be set up within the refrigerating compartment a double circulation of the air therein. Since the air in passageways 47, 21 and 22 is being cooled in heat exchange with the cold walls to which it is exposed, it will gravitate downward where it will engage the sloping surfaces of the flexible evaporators 68 and 69 and will be turned inwardly toward the center of the refrigerating chamber and will then fall to the bottom of the refrigerating chamber. At the same time the warmer air along the sides of the refrigerating chamber will go through passageways 53 and 54 into top chamber 51 and turn back down through the passageways 47 in the heat exchangers 21 and 22, there thus being a complete double circulation of air within the refrigerator chamber. This circulation will completely air-condition the inside of the refrigerator, constantly moving the air therein and preventing the formation of stagnant zones which may injure the keeping characteristics of the refrigerator. All of the air in circulation also will pass over the open top of tank 18, where it may take up additional moisture, if, as usually will be preferable, the liquid in the tank is water or mostly water, and the deodorant in said liquid will operate to adsorb and destroy any odors which may be given off by materials in the refrigerator compartment. The evaporator members 68 and 69 will in practice be rectangular pieces of the cloth or flexible material of which they are composed, which pieces are readily removable for occasional washing, as may be desired.

The advantages of my invention have been quite clearly pointed out in the preceding detailed description. The simplicity, efficiency and convenience of mechanical refrigeration is obtained without any of its heretofore well-recognized defects. These defects have been unequal cooling within the refrigerator chamber, zoning or stagnation of the air in the refrigerator chamber and, perhaps most serious of all, excessive dehydration of materials within the refrigerator chamber caused by frosting of the refrigerator coils and condensation and drip to the drip pans below, all of which moisture in effect must be withdrawn from the materials stored within the refrigerator chamber. With my invention the mechanical refrigerator unit has all its coils buried within the liquid in tank 10. The cooler part of that liquid will naturally be at the bottom of the tank and no parts of the tank are exposed to air within the refrigerator chamber excepting the downward passages through the heat exchangers and at the two sides of the tank. All condensation, therefore, is directly controlled, and where it is sufficient to run down and drip it passes to the evaporator cloths, where it is vaporized within the refrigerator chamber. The circulation of air within the refrigerator chamber is very complete and reaches all parts of its interior, so that not only will there be no zoning or stagnant places, but the temperature within the refrigerator will be substantially uniform throughout the entire interior chamber thereof. Odors will be dissipated and absorbed, there will be no tendency to dehydration, since evaporation from the surface of the liquid within the tank and re-vaporization of any moisture condensed will soon produce a state of saturation of the air in the refrigerating chamber at its reduced temperature. Actually the transfer of heat from the mechanical refrigerating unit to the liquid in the tank and from there to the air within the refrigerator will be far more efficient and less expensive for electrical energy in the compressor than where the compressor is exposed to the air, and, as above pointed out, will effect the cooling of the interior of the refrigerator more rapidly and uniformly than could possibly be the case with an exposed refrigerator unit.

The freezing chamber, being entirely segregated from the air within the refrigerating chamber will be very highly efficient and will freeze ice cubes or other materials therein very rapidly. Excess cold will be passed out through the outer walls of the water-tight freezing compartment into the liquid. If any ice should form, in the event water is the liquid employed, about the outside walls of the freezing chamber or about the coils of the refrigerator unit, no discharge would follow, since such freezing or frosting is from the liquid in the tank and not withdrawn from the air, and it must ultimately melt into the liquid within the tank as the heat thereof is exchanged to the air passing through the heat exchanger passages.

I claim:

1. A refrigerator embodying a closed chamber, a tank in the upper part of said chamber having its side walls and top spaced from the side walls and top of said chamber, said tank adapted to contain a liquid, and having heat exchanger members positioned to be immersed in such liquid with passageways extending vertically through the tank and opening into the top and towards the bottom of the chamber, a mechanical refrigerating unit positioned to be immersed in the liquid for cooling the same, whereby air in the chamber will be cooled in and flow downward through said passageways and the warmer air in the chamber will flow upwardly along the sides of the tank and to the top and back through the heat exchanger passageways, and means extending into the ascending currents of air for evaporating water thereto.

2. A refrigerator embodying a closed chamber, a tank in the upper part of said chamber having its side walls and top spaced from the side walls and top of said chamber, said tank adapted to contain a liquid, and having heat exchanger members positioned to be immersed in such liquid with passageways extending through the tank and opening into the top and towards the bottom of the chamber, a mechanical refrigerating unit positioned to be immersed in the liquid for cooling the same, whereby air in the chamber will be cooled in and flow downward through said passageways and the warmer air in the chamber will flow upwardly along the sides of the tank and to the top and back through the heat exchanger passageways, and troughs underlying the lower ends of the passageways adapted to contain water, and capillary water-conductors extending from the troughs into the ascending currents of air for evaporating water thereto.

3. A refrigerator embodying a closed chamber, means for cooling air to cause it to move downward from the upper part of said chamber to displace the air in the lower part and cause it to move upward, and means for directing said cooled air to move down through the central portion of the chamber and for constraining the air to move in return to the cooling means along the sides of the chamber, said last-named means positioned to receive drip from any condensation from said cooled air and having portions extending into the ascending currents of air whereby the drip will be re-evaporated thereto.

4. A refrigerator embodying a closed chamber, a tank in said chamber adapted to contain a liquid, said tank having its top spaced from the top wall and its sides spaced from the side walls of the chamber to form connected passages along the sides and across the top of said tank, means for cooling liquid in the tank, a pair of heat exchangers each having a passageway positioned to extend vertically through such liquid in said tank and opening into the chamber at the top and bottom respectively of said tank, whereby air within the chamber will be cooled in said passageways and a double circulation of air be set up within the chamber from the bottoms of said passageways to the bottom of the chamber and along the sides of the chamber to the top and above the tank, means below said passageways for collecting water condensed in the passageways and gravitating therefrom, and means for revaporizing said water so condensed.

5. A refrigerator embodying a closed chamber, a tank in said chamber adapted to contain a liquid, said tank having its top spaced from the top wall and its sides spaced from the side walls of the chamber to form connected passages along the sides and across the top of said tank, means for cooling liquid in the tank, a pair of heat exchangers each having a passageway positioned to extend vertically through such liquid in said tank and opening into the chamber at the top and bottom respectively of said tank, whereby air within the chamber will be cooled in said passageways and a double circulation of air be set up within the chamber in descending currents from the bottoms of said passageways to the bottom of the chamber and ascending currents along the sides of the chamber to the top and above the tank, means below said pasageways for collecting water condensed in the passageways and gravitating therefrom, and evaporator means extending into said ascending currents of air for revaporizing said water so condensed.

6. A refrigerator embodying a closed chamber, a tank in said chamber adapted to contain a liquid, a mechanical refrigerating unit positioned to be immersed in such water at a point midway between the sides of the tank and embodying an inner ice-cube freezing chamber with double walls surrounding the same and refrigerating means between the double walls, a heat exchanger within the tank located on each side of the refrigerating unit, each heat exchanger having vertical passageways opening at top and bottom of the tank for cooling the air in the chamber by heat exchange with cooled liquid and for accumulating for gravitating discharge water condensed from the air flowing through said passageways, and means located below the discharge of said vertical passageways for receiving the drip of water so condensed and re-evaporating it to the air within the chamber.

7. A refrigerator embodying a closed chamber, a tank in the upper part of said chamber adapted to contain a liquid and having heat exchanger members positioned to be immersed in such liquid with vertical passageways extending through the tank and opening into the top and towards the bottom of the chamber, a mechanical refrigerating unit positioned to be immersed in the liquid and control means therefor for maintaining the temperature of the liquid near the freezing point, a receptacle adapted to contain water underlying the lower ends of said passageways for receiving water which may condense therein and gravitate therefrom, and means extending out of said receptacle for causing said condensed water to be reevaporated into the chamber.

8. A refrigerator embodying a closed chamber, a tank in the upper part of said chamber adapted to contain a liquid and having heat exchanger members positioned to be immersed in such liquid with vertical passages extending through the tank and opening into the top and toward the bottom of the chamber, a mechanical refrigerating unit positioned to be immersed in the liquid between said heat exchanger members, and partitions in the spaces between said unit and the heat exchanger, and members extending across the tank but having their upper and lower edges above and below the bottom and top of the tank respectively so as to form channels above and below said partitions through which liquid can flow to effect a double circulation within the tank.

9. A refrigerator embodying a closed chamber, a tank in the upper part of said chamber adapted to contain a liquid, means in the tank to cool such liquid, said tank being insulated all around said insulation in part consisting of vertical open-ended heat exchanger air passages at each side, said tank positioned to provide with the walls of the chamber a top air passage and side air passages extending therefrom alongside said insulating passages, and other open-ended, vertical heat exchanger air passages extending from the top passage towards the bottom of the chamber, whereby air within the chamber will be cooled in said heat exchanger passages, and a double circulation of air be set up within the chamber, descending from the bottom of said heat exchanger passages to the central bottom of the chamber and ascending along the sides of the chamber to the top and above the tank.

FRANK A. WHITELEY.